United States Patent [19]

Wakui et al.

[11] Patent Number: 4,669,021
[45] Date of Patent: May 26, 1987

[54] TAPE CASSETTE HAVING A TRANSPARENT WINDOW

[75] Inventors: Yoshiaki Wakui, Tokyo; Hiroyuki Umeda, Yokohama, both of Japan

[73] Assignee: Victor Company of Japan, Ltd., Japan

[21] Appl. No.: 557,280

[22] Filed: Dec. 2, 1983

[30] Foreign Application Priority Data

Dec. 10, 1982 [JP] Japan ................................ 57-216537

[51] Int. Cl.$^4$ ............................................. G11B 23/04
[52] U.S. Cl. ..................................... 360/132; 242/199
[58] Field of Search ..................... 360/132, 83, 85, 93, 360/95; 242/197–200; 352/75; 206/387

[56] References Cited

U.S. PATENT DOCUMENTS 4,419,708 12/1983 Ogiro et al. ......................... 360/132

FOREIGN PATENT DOCUMENTS 0052479 5/1982 European Pat. Off. .
2157919 6/1973 Fed. Rep. of Germany ...... 242/199
2709142 9/1978 Fed. Rep. of Germany ...... 242/199

OTHER PUBLICATIONS

Kelm, K., "A Simple Tape–Tension Measuring Cassette for Home Construction", Elktron Inc., No. 8, 1981.

Primary Examiner—John H. Wolff
Assistant Examiner—David J. Severin
Attorney, Agent, or Firm—Andrus, Sceales, Starke & Sawall

[57] ABSTRACT

A tape cassette is used with a recording and/or reproducing apparatus which has an optical tape end detector which is constituted by a light emitting element and light receiving elements. The tape cassette comprises an opaque cassette case having a transparent window, and a lid located at the front of the cassette case. The cassette case accommodates therein a supply reel, a take-up reel, and a magnetic tape. The transparent window enables visual detection of a wound state of the magnetic tape with respect to the reels. The magnetic tape has transparent tapes connected at ends thereof, and forms a predetermined tape path along the front of the cassette case. The transparent tapes are optically detected by the optical tape end detector when the transparent tapes are drawn out from the reels. The lid is capable of assuming an open state and a closed state, and covers the magnetic tape in the predetermined tape path in its closed state. The transparent window is formed in a top plate of the cassette case, in a region which is closer to the rear of the cassette case than a line which passes centers of the reels in a plan view of the tape cassette.

3 Claims, 10 Drawing Figures

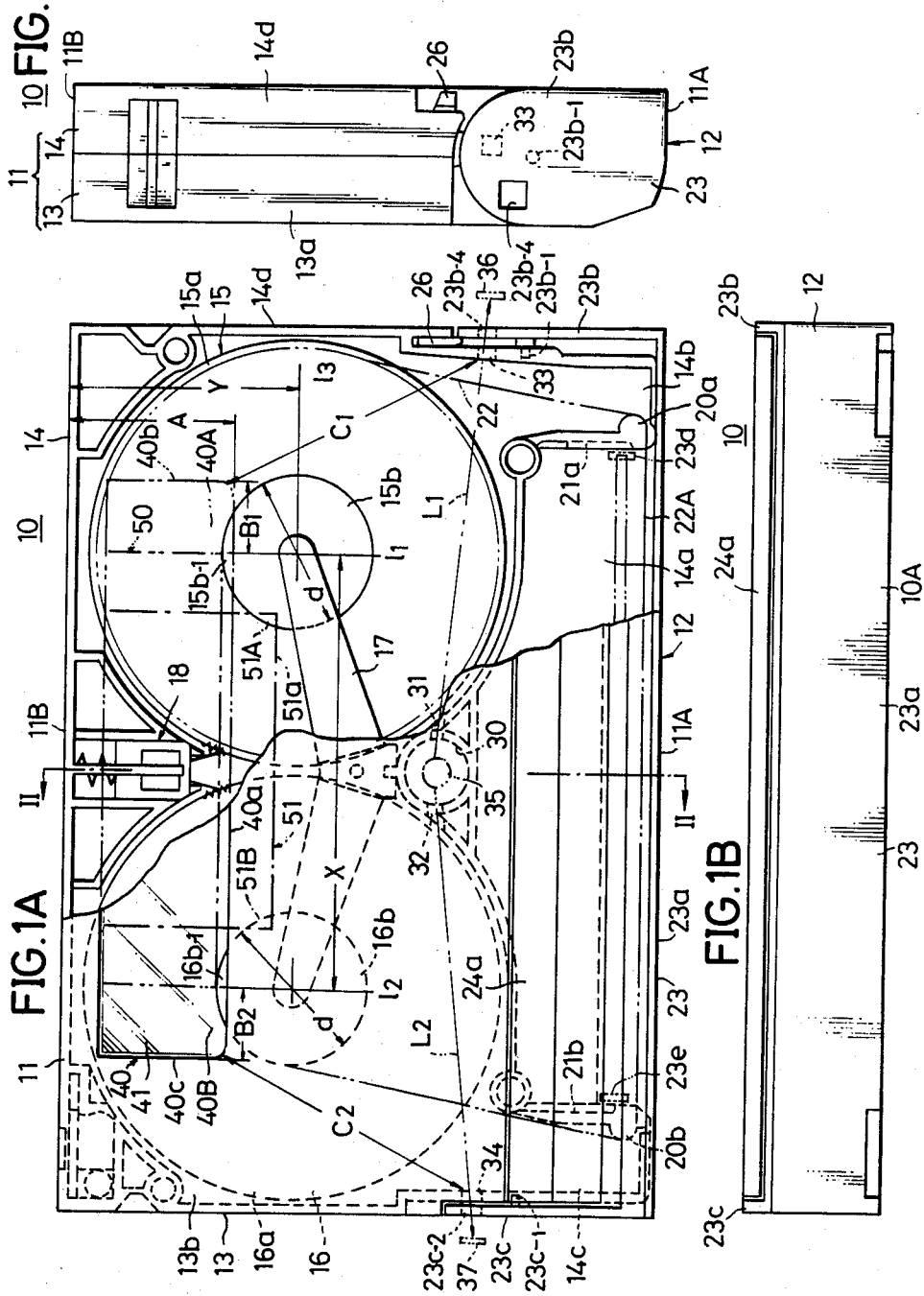

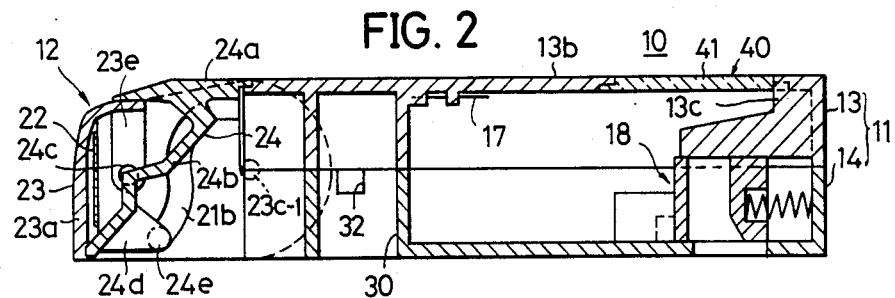
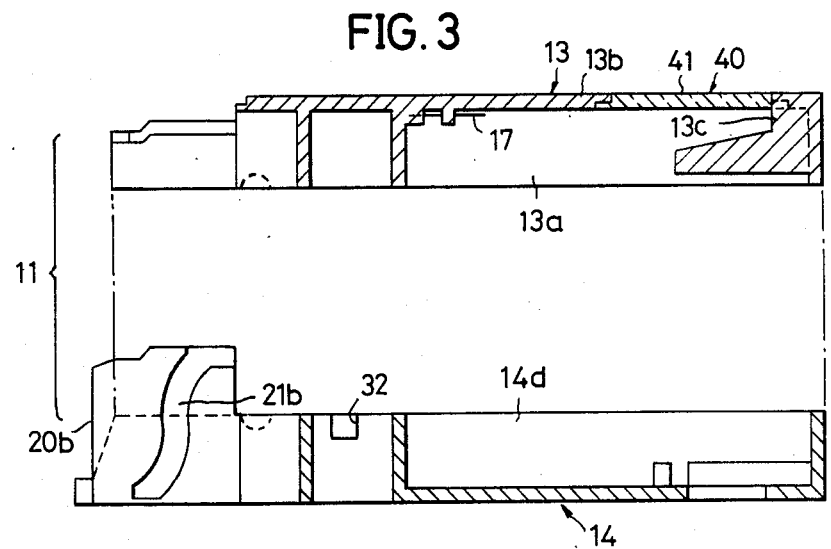
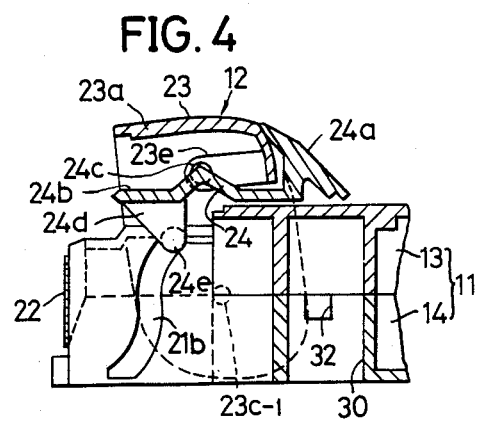

TAPE CASSETTE HAVING A TRANSPARENT WINDOW

BACKGROUND OF THE INVENTION

The present invention generally relates to tape cassettes, and more particularly to a tape cassette having a transparent window which enables visual detection of a wound state of a magnetic tape with respect to a supply reel and a take-up reel of the tape cassette, from outside the tape cassette.

Generally, a tape cassette which is used with respect to a recording and reproducing apparatus such as a video tape recorder, accommodates a magnetic tape which has transparent tapes connected at ends thereof. When the tape cassette is loaded into the video tape recorder, the tape is loaded unto a predetermined tape path so that the tape opposes an optical tape end detector of the video tape recorder. If the transparent tape is drawn out of one of a supply reel and a take-up reel of the tape cassette during a mode of the video tape recorder in which the tape travels, the transparent tape is detected by the optical tape end detector, and the tape travel is stopped to put the video tape recorder in a stop mode. Generally, the optical tape end detector comprises a lamp which relatively enters within the tape cassette when the tape cassette is loaded into the video tape recorder, and a photocell which opposes an opening in a side wall of the tape cassette when the tape cassette is loaded. In addition, the tape cassette has a transparent window which enables visual detection of a wound state of the tape with respect to the reels of the tape cassette, such as the remaining quantity of tape on the reels, from outside the tape cassette. The transparent window is generally located at a position opposing the reels, that is, at a location which is substantially at the center with respect to the front and rear of the tape cassette.

Recently, various compact type tape cassettes have been proposed, which are designed so as to enable downsizing of the video tape recorder. However, if the tape cassette is simply downsized with the above transparent window located at the position opposing the reels, the opening in the side wall of the tape cassette will be located quite close to the transparent window. In other words, the distance between the transparent window and the opening in the side wall of the tape cassette, will become considerably small. Accordingly, in a state where the compact type tape cassette is loaded into the video tape recorder, a part of an external light may pass through the transparent window and reach the photocell of the optical tape end detector, according to the angle of incidence and the direction of the impinging light with respect to the tape cassette. Thus, the external light may pass through the transparent window and the opening in the side wall of the tape cassette, and finally reach the photocell, regardless of the remaining quantity of tape on the reels. In such a case, the optical tape end detector will erroneously detect that the transparent tape has been reached, although the magnetic tape was actually detected and the transparent tape was never detected. Therefore, the conventional tape cassette had a problem in that the optical tape end detector could easily carry out an erroneous detection of the transparent tape, if the conventional tape cassette is simply downsized.

Further, the problem related to the erroneous detecting operation of the optical tape end detector will be eliminated if the transparent window is not provided in the tape cassette. However, without the transparent window, it will be impossible to visually detect the wound state of a magnetic tape with respect to the reels of the tape cassette, from outside the tape cassette, and the omission of this feature would be inconvenient for the user.

SUMMARY OF THE INVENTION

Accordingly, it is a general object of the present invention to provide a novel and useful tape cassette in which the above described problems have been overcome.

Another and more specific object of the present invention is to provide a tape cassette having a transparent window which enables visual detection of a wound state of a magnetic tape within the tape cassette, in which the transparent window is formed in a top surface of a cassette case at a location which is in a vicinity of the rear of the cassette case. According to the tape cassette of the present invention, it is possible to provide sufficient separation between the transparent window and an opening in a side wall of the cassette case, even if the size of the tape cassette is small. Thus, it is possible to prevent an optical tape end detector which detects transparent tapes connected at ends of the magnetic tape, from carrying out an erroneous detecting operation, such as an erroneous detection of the transparent tape when the magnetic tape is actually detected, in response to an external light which enters into the tape cassette through the transparent window. Therefore, the tape cassette according to the present invention has the transparent window, but the optical tape end detector is positively prevented from carrying out an erroneous detecting operation.

Other objects and further features of the present invention will be apparent from the following detailed description when read in conjunction with the accompanying drawings.

BRIEF DESCRIPTION OF THE DRAWINGS

FIGS. 1A, 1B, and 1C are a plan view (with a right half of an upper half and a part of a tape protecting lid cut away), a front view, and a side view, respectively showing an embodiment of a tape cassette according to the present invention;

FIG. 2 is a side view in vertical cross section, showing the tape cassette along a line II—II in FIG. 1A;

FIG. 3 is a side view in vertical cross section, showing upper and lower halves of a cassette case in a separated state;

FIG. 4 is a side view in vertical cross section, showing a front part of the tape cassette in a state where a tape protecting lid is open;

DETAILED DESCRIPTION

Figure 5:
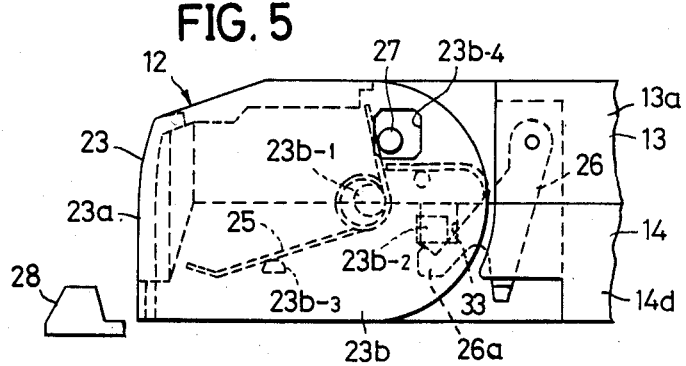
FIGS. 5 and 6 are side views respectively showing a tape protecting lid together with a locking mechanism in a state where an outer lid member is closed, and in a state where the outer lid member is open.

As shown in FIGS. 1A, 1B, 1C, and 2, a tape cassette 10 comprises a cassette case 11, and a tape protecting lid 12 which is provided at a front 11A of the cassette case 11. The tape cassette 10 is small, and has a width of 95 mm, a depth of 62.5 mm, and a thickness of 15 mm.

The cassette case 11 is made up from an upper half 13 and a lower half 14 as shown in FIG. 3. These upper and lower halves 13 and 14 are both opaque, and are made from an acrylonitrile butadiene styrene (ABS) resin. A supply reel 15 and a take-up reel 16 are accommodated within the cassette case 11, in a state where the reels 15 and 16 are pushed against the lower half 14 by a substantially V-shaped leaf spring 17 which is fixed to the upper half 13. The reels 15 and 16 respectively comprise reel flanges 15a and 16a, and reel hubs 15b and 16b which have a diameter d of 16 mm. A separation X between the reels 15 and 16 is set to 46.2 mm. The reels 15 and 16 are respectively arranged in parallel at locations where centers of these reels 15 and 16 are reparated by a distance Y (24.35 mm) from a rear 11B of the cassette case 11. A brake mechanism 18 is provided within the cassette case 11, at a location which is in the vicinity of the rear 11B thereof. A cutout opening 14a is formed at the front central part of the lower half 14, and loading poles (not shown) of a video tape recorder (not shown) enter into this cutout opening 14a when drawing a magnetic tape 22 out of the cassette case 11. Projecting side parts 14b and 14c which relatively extend frontward of the cassette case 11, are respectively formed at the right and left sides of the lower half 14. A side wall 14d which has one-half the height of the cassette case 11, extends along the outer edges of the side parts 14b and 14c.

The magnetic tape 22 is in a predetermined tape path 22A when the tape cassette 10 is not in use. The tape 22 is drawn out from the supply reel 15, passed through the side part 14b, guided by tape guide parts 20a and 20b so as to cross the front of the cutout opening 14a, passed through the side part 14c, and then taken up by the take-up reel 16, to form this predetermined tape path 22A.

The tape protecting lid 12 has a two-piece construction, and comprises an outer lid member 23 and an inner lid member 24. The tape protecting lid 12 is mounted at the front 11A of the cassette 11, and assumes a state shown in FIG. 2 when closed, and assumes a state shown in FIG. 4 when opened. When the tape protecting lid 12 is closed, the outer and inner lid members 23 and 24 cooperate to simultaneously protect the front surface (magnetic surface) and the rear surface of the tape 22, as shown in FIG. 2.

The outer lid member 23 comprises a front wall 23a which extends up to the top surface of the cassette case 11 so as to form a portion of the top surface of the cassette case 11, side walls 23b and 23c, and arms 23d and 23e which support the inner lid member 24. As shown in an enlarged scale in FIGS. 5 and 6, pins 23b-1 and 23c-1 are respectively located substantially at centers of the side walls 23b and 23c. A side wall 13a of the upper half 13 cooperates with the side wall 14d of the lower half 14, to form bearings for the pins 23b-1 and 23c-1. Thus, the outer lid member 23 is rotatably supported in a state where the pins 23b-1 and 23c-1 are supported by the above bearings which are located at substantially one-half the height of the cassette case 11.

The inner lid member 24 comprises an elongated top plate 24a, and a sloping wall 24b which slopes downward toward the front of the cassette case 11 from the top plate 24a. The sloping wall 24b comprises projections 24c (only one shown) at a central part thereof, and arm portions 24d (only one shown) at a lower part thereof. The projections 24c on the sloping wall 24b respectively fit into holes which are formed in the arms 23d and 23e. The arm portions 24d respectively have a cam-following projection 24e (only one shown). The cam-following projections 24e fit into the cam grooves 21a and 21b, so that the cam-following projections 24e are movable along cam grooves 21a and 21b. Hence, the inner lid member 24 is linked to the cassette case 11, in a state where the cam-following projections 24e are fitted into the cam grooves 21a and 21b. On the other hand, the inner lid member 24 is linked to the outer lid member 23, in a state where the projections 24c of the sloping wall 24b are pivotally supported by the holes in the arms 23d and 23e. Accordingly, the inner lid member 24 moves under guidance of the cam grooves 21a and 21b as the outer lid member 23 rotates.

As shown in FIG. 5, the tape protecting lid 12 is normally urged toward its closing direction by a torsion spring 25, and a hook 26a of a lock lever 26 locks a projection 23b-2 which is formed on the inner side of the side wall 23b, to lock the tape protecting lid 12 in its locked position. The torsion spring 25 is fitted over the pin 23b-1, with one arm thereof mounted on a projection 27 which is formed on the side wall of the upper half 13, and with the other end thereof mounted on a projection 23b-3 which is formed on the inner side of the side wall 23b.

Figure 6:
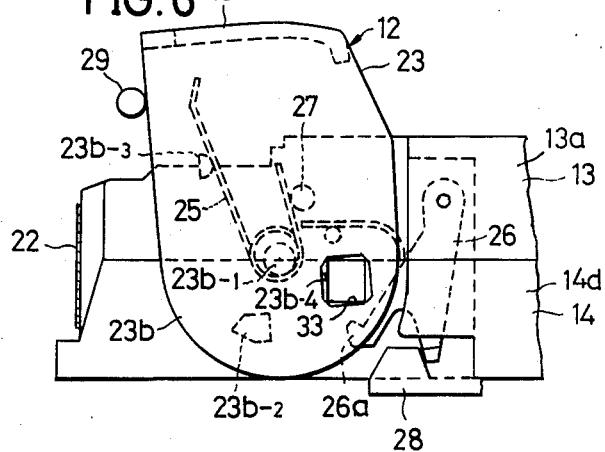

When the tape cassette 10 is inserted into a cassette housing (not shown) within the video tape recorder (not shown), a lock release lever 28 of the video tape recorder engages with the lock lever 26 as shown in FIG. 6, to rotate the lock lever 26 counterclockwise. Thus, the hook 26a of the lock lever 26 separates from the projection 23b-2, and the locking with respect to the tape protecting lid 12 is released. During a process in which the tape cassette 10 within the cassette housing is loaded into a predetermined position within the video tape recorder by lowering the cassette housing, the outer lid member 23 is rotated clockwise by approximately 90° against the force exerted by the torsion spring 25, by a pin 29 of the video tape recorder. As a result, the cam-following projections 24e of the inner lid member 24 are respectively guided along the cam grooves 21a and 21b, and the inner lid member 24 rotates clockwise about the pins 23b-1 and 23c-1 so that the lower edge of the sloping wall 24b does not make contact with the tape 22. Thus, the tape protecting lid 12 opens as shown in FIG. 4. Then, the loading poles of the video tape recorder which had relatively entered within the cutout opening 14a, move out of the cutout opening 14a without being interfered by the tape protecting lid 12. Accordingly, the loading poles intercept and draw the tape 22 out of the cassette case 11 from the front thereof.

When the force applied to the tape protecting lid 12 by the pin 29 so as to keep the tape protecting lid 12 open is cancelled during a cassette ejecting operation, the tape protecting lid 12 is automatically rotated counterclockwise by the force exerted by the spring 25, and assumes the closed position shown in FIGS.2 and 5.

A hole 30 into which a lamp 35 enters, is formed in a bottom surface of the cassette case 11, at a location between the reels 15 and 16 in the cutput opening 14a. The lamp 35 of the video tape recorder will be described later. Cutouts 31 and 32 are formed at predetermined locations in a vertical wall defining the opening 30. Optical paths which will be described later on in the specification, are formed through these cutouts 31 and 32. In addition, rectangular openings 33 and 34 are formed in the side wall 14d at the right and left of the lower half 14 closer to the front of the cassette case 11. These rectangular openings 33 and 34 are located at positions opposing the side walls 23b and 23c of the outer lid member 23, so that the side walls 23b and 23c function as shutters. Thus, the rectangular openings 33 and 34 are closed by the side walls 23b and 23c as shown in FIGS. 1C and 5 when the tape protecting lid 12 is closed. When the tape protecting lid 12 opens, rectangular openings 23b-4 and 23c-2 which are formed in the side walls 23b and 23c, respectively coincide with the rectangular openings 33 and 34 as shown in FIG. 6, and the openings 33 and 34 are open in this state.

As shown in FIG. 1A, the tape cassette 10 is loaded into the video tape recorder in a state where the lamp 35 is inserted into the opening 30, and the openings 33 and 34 which are open respectively oppose photocells 36 and 37. Hence, the light which is emitted from the lamp 35, forms an optical path $L_1$ which passes through the cutout 31 and the openings 33 and 23b-4, and reaches the photocell 36. On the other hand, the light which is emitted from the lamp 35, also forms an optical path $L_2$ which passes through the cutout 32 and the openings 34 and 23c-2, and reaches the photocell 37. The optical paths $L_1$ and $L_2$ are formed closer to the front of the cassette case, and respectively pass through upper and lower reel flanges 15a and 16a of the supply and take-up reels 15 and 16.

When all of the magnetic tape 22 is drawn out of the supply reel 15 and the transparent tape begins to be drawn out of the supply reel 15, the light from the lamp 35 which was blocked by the magnetic tape 22 up to that point can then pass through the transparent tape. The light which passes through the transparent tape, passes through the openings 33 and 23b-4, and reaches the photocell 36. On the other hand, when all of the magnetic tape 22 is drawn out of the take-up reel 16 and the transparent tape begins to be drawn out of the take-up reel 16, the light from the lamp 35 which was blocked by the magnetic tape 22 up to that point can then pass through the transparent tape. The light which passes through the transparent tape, passes through the openings 34 and 23c-2, and reaches the photocell 37. The end of the tape 22 is thus detected in this manner while the tape 22 is traveling in the forward or reverse direction.

The tape cassette 10 also has a transparent window 40 which constitutes an essential part of the present invention, as shown in FIG. 1A. This transparent window 40 enables visual detection of a wound state of the tape 22 with respect to the reels 15 and 16, from outside the tape cassette 10. The transparent window 40 is located on the upper surface of the cassette case 11, closer to the rear 11B of the cassette case 11. In the present embodiment of the invention, the transparent window 40 has an oblong shape with a dimension of 62 mm by 13 mm. The transparent window 40 is arranged so that corner portions 40A and 40B at the lower right and left corners thereof, respectively overlap a part of the reel hub 15b of the supply reel 15 and a part of the reel hub 16b of the take-up reel 16 as shown in FIG. 1A. Thus, the corner portions 40A and 40B respectively oppose parts 15b-1 and 16b-1 of the reel hubs 15b and 16b closer to the rear 11B of the cassette case 11, in the transparent reel flanges 15a and 16a. The transparent window 40 is arranged so that these parts 15b-1 and 16b-1 of the reel hubs 15b and 16b are visible through the corner portions 40A and 40B. In other words, the transparent window 40 is designed to have dimensions so that, a distance A from the rear 11B of the cassette case 11 to a front edge 40a of the transparent window 40, a distance $B_1$ from a line $l_1$ which is in the depth direction of the cassette case 11 and passes through a center of the supply reel 15 to a right edge 40b of the transparent window 40, and a distance $B_2$ from a line $l_2$ which is in the depth direction of the cassette case 11 and passes through a center of the take-up reel 16 to a left edge 40c of the transparent window 40, are each set to minimum distances which would allow the wound state of the tape 22 to be visually detected through the transparent window 40. For example, the distance A is set approximately equal to 18 mm, and the distances $B_1$ and $B_2$ are respectively set approximately equal to 8 mm.

The corner portions 40A and 40B are closest to the openings 33 and 34 among portions of the transparent window 40. However, a distance $C_1$ between the corner portion 40A and the opening 33, and a distance $C_2$ between the corner portion 40B and the opening 34, respectively become approximately equal to 31 mm. Therefore, although the size of the tape cassette 10 is small, the distances $C_1$ and $C_2$ are relatively long.

Next, description will be given with respect to the possibility of an external light which has entered into the cassette case 11 through the transparent window 40, reaching the photocells 36 and 37 through the openings 33 and 34, in a state where the tape cassette 10 is loaded into the video tape recorder. The external light which passes through the central portion of the transparent window 40 and travels toward the openings 33 and 34, is blocked by the magnetic tape 22 which is in a tape path portion between the supply reel 15 and the tape guide part 20a and a tape path portion between the take-up reel 16 and the tape guide part 20b, among the tape path 22A. Thus, the external light which passes through the central portion of the transparent window 40 will not reach the openings 33 and 34, and will therefore cause no problems.

On the other hand, with respect to the paths of light which enter into the cassette case 11 from the corner portions 40A and 40B of the transparent window 40 and travel toward the openings 33 and 34, the light traveling in these light paths will be blocked by the tape rolls themselves and portions of the magnetic tape 22 between the supply reel 15 and the tape guide part 20a and between the take-up reel 16 and the tape guide part 20b, when the diameters of the tape rolls on the reels 15 and 16 are large. However, as the diameters of the tape rolls on the reels 15 and 16 decrease, the path of the magnetic tape 22 between the supply reel 15 and the tape guide part 20a moves toward the center of the supply reel 15, and the path of the magnetic tape 22 between the take-up reel 16 and the tape guide part 20b moves toward the center of the take-up reel 16. For example, when the tape roll remaining on the take-up reel 16 is small, the path of the magnetic tape 22 between the take-up reel 16 and the tape guide part 20b, will not intersect with the path of light entering from the corner portion 40B of the transparent window and traveling toward the opening 34, as shown in FIG. 1A. Accordingly, in this case, the light entering into the cassette case 11 through the corner portion 40B of the transparent window 40, will reach the opening 34 without being blocked by the magnetic tape 22. Thus, although there actually is some tape wound around the take-up reel 16 in this case, the optical tape end detector which is constituted by the lamp 35 and the photocells 36 and 37 may erroneously detect that the transparent tape has been reached, that is, that the end of the tape has been reached.

However, according to the tape cassette 10 of the present invention, the distances $C_1$ and $C_2$ are large. As a result, the light entering into the cassette case 11 through the corner portions 40A and 40B of the transparent window 40, will be reflected by the lower flanges of the reels 15 and 16 and the like, and will not reach the openings 33 and 34. In other words, the light entering into the cassette case 11 through the corner portions 40A and 40B of the transparent window 40, will not be received by the photocells 36 and 37. Hence, the optical tape end detector will be prevented from carrying out an erroneous detecting operation in which the transparent tape, that is, the end of the tape, is erroneously detected although there actually is some tape wound around the reels 15 and 16.

The transparent window 40 is located at a position so that the external light entering into the cassette case 11 through the transparent window 40 will not cause the optical tape end detector to carry out in erroneous detecting operation. However, a part of the reel hubs 15b and 16b is still visible through the transparent window 40 which is located at this position. Therefore, the wound state of the magnetic tape 22 with respect to the reels 15 and 16 can be visually detected through the transparent window 40 with ease, and it is possible to visually detect the quantity of tape remaining on the reels 15 and 16 until the quantity of tape remaining on the reels 15 and 16 become zero.

When the wound state of the tape with respect to the reels 15 and 16 is visually detected through the transparent window 40, the leaf spring 17 will not be visible through the transparent window 40. Accordingly, the location of the transparent window 40 will not change the fine appearance of the tape cassette 10.

Figure 7A:
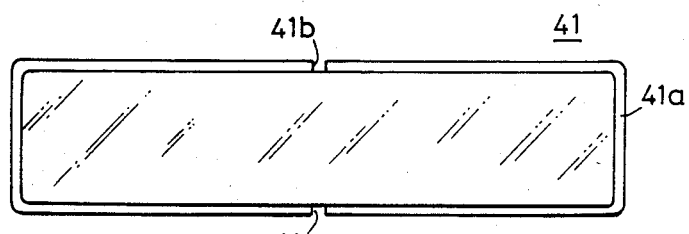
FIGS. 7A and 7B are a plan view and a front view respectively showing a transparent plate which constitutes a transparent window.
Figure 7B:
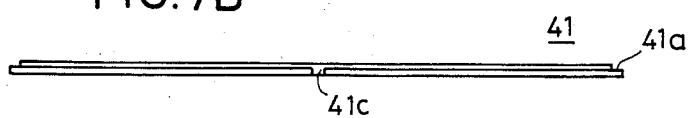

As shown in FIGS. 1A, 2, and 3, the transparent window 40 is formed by fitting a transparent plate 41 which is shown in FIGS. 7A and 7B into the oblong opening in a top plate 13b of the upper half 13 from the back of the top plate 13b. The transparent plate 41 is fixed to the top plate 13b by a binding agent. The transparent plate 41 comprises a step portion 41a which is formed around the periphery thereof. Moreover, as shown in FIG. 7A, cutouts 41b and 41c are respectively formed at upper and lower centers of the transparent plate 41. The cutout 41b is designed to fit over a stopping rib 13c which hangs from the top plate 13b of the upper half 13, so as to position the transparent plate 41. Because the cutouts 41b and 41c of the transparent plate 41 are provided at mutually opposing positions, the transparent plate 41 can be mounted onto the top plate 13b with the cutout 41b facing the front of the cassette case 11 or with the cutout 41c facing the rear of the cassette case 11. As a result, the process of mounting the transparent plate 41 with respect to the top plate 13b can be carried out efficiently.

The transparent plate 41 is made from a polymethyl methacrylate resin or a styrene acrylonitrile resin.

The optical tape and detector will be prevented from carrying out an erroneous detecting operation if the distances A, $B_1$, and $B_2$ of the transparent window 40 are set to small values, however, it will become difficult to visually detect the wound state of the tape if these distances A, $B_1$, and $B_2$ are set to small values. The present inventors have tested various transparent windows which could allow visual detection of the wound state of the tape within the cassette case 11. As the result of testing, it was found that the distance A had to be approximately equal to 18 mm or less, and that the distances $B_1$ and $B_2$ had to be approximately equal to 8 mm or less, in order to positively prevent the optical tape end detector from carrying out an erroneous detecting operation. Accordingly, the dimensions of the transparent window 40 should be in a range such that the distance A is in a range of 16.35 mm to approximately 18 mm, and the distances $B_1$ and $B_2$ is in a range of zero to approximately 8 mm. In the embodiment described heretofore, the distances A, $B_1$, and $B_2$ of the transparent window 40 are respectively set to maximum values which would prevent the erroneous detecting operation of the optical tape end detector, and the wound state of the tape within the cassette 11 can be visually detected with ease.

When the distance A is equal to 16.35 mm, the front edge 40a of the transparent window 40 will be tangent to the parts 15b-1 and 16b-1 of the reel hubs 15b and 16b. On the other hand, when the distances $B_1$ and $B_2$ are respectively equal to zero, the right and left edges 40b and 40c of the transparent window 40 respectively coincide with the lines $l_1$ and $l_2$ described before. In this case, the transparent window assumes a minimum size, and a minimum-sized transparent window 50 is indicated by a two-dot chain line in FIG. 1A. Therefore, in the tape cassette according to the present invention, the size of the transparent window is in a range between the maximum-sized transparent window 40 and the minimum-sized transparent window 50.

If the length of the transparent window is made smaller than the separation X between the centers of the reels 15 and 16, it becomes possible to set the distance A close to the distance Y. For example, it is thus possible to employ a transparent window 51 which is indicated by a one-dot chain line in FIG. 1A. In this transparent window 51, a front edge 51a thereof closer to the tape protecting lid 12, is close to a line $l_3$ which passes through the centers of the reels 15 and 16. Moreover, a part of the reel hubs 15b and 16b is visible through corner portions 51A and 51B at the right and left of the transparent window 51 closer to the front edge 51a thereof.

Further, the present invention is not limited to these embodiments, but various variations and modifications may be made without departing from the scope of the present invention.

What is claimed is:

1. A tape cassette used with a recording and/or reproducing apparatus, said recording and/or reproducing apparatus having an optical tape end detector which is constituted by a light emitting element and light receiving elements, said tape cassette comprising:
   an opaque cassette case for accommodating therein a supply reel having a reel hub, a take-up reel having a reel hub, and a magnetic tape which is wound around said supply and take-up reels, said magnetic tape forming a predetermined tape path along a front of said cassette case;
   a transparent window having a substantially rectangular shape for enabling visual detection of a wound state of said magnetic tape with respect to said reels, said transparent window being formed in a top plate of said cassette case;
   at least one opening provided in a side wall of said cassette case for passing light which is emitted from said light emitting element when the tape cassette is loaded into said apparatus, said at least one opening being located in a region which is closer to the front of said cassette case than a first line which passes through the centers of said reels in a plan view of said tape cassette; and a lid located at the front of said cassette case, said lid being capable of assuming an open state and a closed state and covering said magnetic tape in said predetermined tape path in the closed state thereof, said magnetic tape having transparent tape portions connected at ends thereof, said transparent tape portions being optically detected by said optical tape end detector when said transparent tape portions are drawn out from said reels, said transparent window having a front edge which is located in a range between said first line and a second line which is tangent to said reel hubs of said reels in a region which is closer to the rear of said cassette case in the plan view of said tape cassette and having right and left edges which respectively coincide with or fall short of third and forth lines which respectively pass through the centers of said reels and extend along a depth direction of said tape cassette in the plan view of said tape cassette, each of right and left front corner portions of said transparent window opposing a part of one of said reel hubs so that said optical tape end detector detects said transparent tape portions but does not detect external light entering said tape cassette through said transparent window.

2. A tape cassette as claimed in claim 1 which said transparent window is constituted by an oblong shaped transparent plate which is fitted into and fixed to an oblong opening formed in the top plate of said cassette case.

3. A tape cassette as claimed in claim 1, in which said front edge of said transparent window intersects each of rear portions of the reel hubs of said reels in the plan view of said tape cassette.

* * * * *